(12) United States Patent
Kimura

(10) Patent No.: US 7,067,785 B2
(45) Date of Patent: Jun. 27, 2006

(54) SOLID-STATE IMAGE PICKUP DEVICE USED AS A PHOTOELECTRIC CONVERSION DEVICE WITH IMPROVED DYNAMIC RANGE

(75) Inventor: Naoki Kimura, Tsurugashima (JP)

(73) Assignee: Toko, Inc., Tokyo (JP)

( * ) Notice: Subject to any disclaimer, the term of this patent is extended or adjusted under 35 U.S.C. 154(b) by 219 days.

(21) Appl. No.: 10/439,066

(22) Filed: May 15, 2003

(65) Prior Publication Data

US 2003/0213962 A1 Nov. 20, 2003

(30) Foreign Application Priority Data

May 17, 2002 (JP) .............................. 2002-142596

(51) Int. Cl.
*H01L 27/00* (2006.01)
*G04N 5/335* (2006.01)
(52) U.S. Cl. .............................. 250/208.1; 250/214 R; 348/310
(58) Field of Classification Search ............ 250/214 R, 250/208.1; 348/300, 302, 304, 307, 308, 348/310
See application file for complete search history.

(56) References Cited

U.S. PATENT DOCUMENTS 5,900,623 A * 5/1999 Tsang et al. ............. 250/208.1
6,111,245 A * 8/2000 Wu et al. ................ 250/208.1
6,831,691 B1 * 12/2004 Takada et al. ............. 348/308

FOREIGN PATENT DOCUMENTS

| JP | 05-048844 | 2/1993 |
|---|---|---|
| JP | 09-232555 | 9/1997 |
| JP | 2001-238133 | 8/2001 |

* cited by examiner

*Primary Examiner*—Thanh X. Luu
*Assistant Examiner*—Stephen Yam
(74) *Attorney, Agent, or Firm*—Cohen, Pontani, Lieberman & Pavane

(57) ABSTRACT

It is an object of the present invention to provide a solid-state image pickup device capable of preventing any output variation due to a threshold voltage variation, and preventing a dynamic range from being narrowed in conjunction with deterioration in outputs due to a lowered threshold voltage. The present invention provides improvements in type and connection of a reset transistor, a select transistor, and an amplifier transistor to achieve the above object. Specifically, the present invention provides a solid-state image pickup device comprising a first MOS transistor serving as a reset switch, a second MOS transistor serving as a select switch, a photodiode, and a third MOS transistor having a source connected in series with the photodiode. In this solid-state image pickup device, the first and second MOS transistors are connected in series with one another between a voltage source and an output end, and the photodiode and the third MOS transistor are connected in series with one another between a voltage source and a ground. Further, the connection point between the first and second MOS transistors is connected to the gate of the third MOS transistor.

3 Claims, 4 Drawing Sheets

SOLID-STATE IMAGE PICKUP DEVICE USED AS A PHOTOELECTRIC CONVERSION DEVICE WITH IMPROVED DYNAMIC RANGE

CROSS-REFERENCE TO RELATED APPLICATIONS

This application is based upon and claims the benefit of priority from the prior Japanese Patent Application No.2002-142596, filed May 17, 2002, the entire contents of which are incorporated herein by reference.

FIELD OF THE INVENTION

The present invention relates to a solid-state image pickup device for use as a photoelectric conversion circuit, and more particularly to the circuit configuration of a solid-state image pickup device using a MOS transistor.

BACKGROUND OF THE INVENTION

There has been known an AMI (Amplified MOS Imager) as one among various types of solid-state image pickup devices. The AMI comprises one photodiode and three NMOS transistors. During a photoelectric conversion process in the AMI, the potential of the photodiode is lowered in conjunction with the generation of photoelectrically converted signals (electrons), and the potential change after amplified by one of the MOS transistors is read out as current.

FIG. 7 shows the circuit of the above. The AMI circuit comprises one photodiode, and three NMOS transistors or reset, select and amplifier transistors. When the reset transistor TR is turned on to apply a reverse bias to the photodiode PD, a depletion layer is extended to provide an increased junction capacitance, and a photodiode voltage (hereinafter referred to as PD voltage) of the photodiode PD is set at a reset voltage by charging the junction capacitance.

After the reset operation, if both the reset transistor TR and the select transistor TS are in their OFF state, charges accumulated on the junction capacitance will be confined and held therein. Nevertheless, some leak current will be generated around the interface of the PN junction of the photodiode PD. When light is incident on the photodiode PD, the resulting recombination of electrons and holes causes decline in the PD voltage. In order to read out the PD voltage during this process, the transistor TS is turned on to provide an output on all OUT terminal. Before the outputting, the PD voltage signal has been amplified through the amplifier transistor TA.

One of features of the AMI can be describes as follows. The reset voltage obtained from a switching operation of the reset transistor TR (the term "switching operation" herein means an operation of applying a pulsed voltage øR for controlling the gate voltage from 0 (zero) to VDD to turn on/off the reset transistor TR completely) is calculated as follows.

$$VDD(=\o R)-Vth \quad (1)$$

Thus, the reset voltage is restricted by Vth in the switching operation.

Then, the PD voltage is output from source of the amplifier transistor TA because it is used as a source follower, and consequently the output voltage is additionally lowered by a factor of Vth. That is, the output is lowered by a factor of 2×Vth, as shown in FIG. 7.

For example, assuming that the select transistor TS is operated in the non-saturation region, and the voltage drop in the select transistor is 0.1 V, the AMI has the following output.

$$VDD-2Vth-0.1\ V \quad (2)$$

Given that VDD is 3.3 V, and Vth is 0.7 V, the output is calculated as follows.

3.3−2×0.7 V−0.1 V=1.8 V

That is, the AMI has a dynamic range of 1.8 V.

An A/D converter is one of essential components of a detect sensor such as image sensors. For example, if a 10-bit A/D converter is arranged in a subsequent stage of the AMI, the output 1.8 V from the AMI have to be divided by 1024 (=210=10 bits). Thus, the comparison voltage of the A/D converter will be set at 18/1024=1.75 mV. The malfunction of the A/D converter is reduced as the comparison voltage is increased. From this point of view, it is desired to extend the output range from the pixel section so as to allow the comparison voltage to be set higher.

Generally, a sensor based on amplified-type image pickup devices involve a serious problem due to variation in the threshold voltage (Vth), such that when an output from the sensor is displayed as an image on a display screen, a stripe pattern appears on a specific portion of the screen and stays at the same position with uneven brightness. This is a typical noise, so-called "Fixed Pattern Noise", in the amplified-type image pickup devices. For this reason, a conventional detect sensor such as image sensors has been required to take measures such as performing a correlated double sampling (CDS) using a noise canceling circuit, or employing a process having less variation in the threshold voltage.

The operational timing of the AMI will be described below with reference to FIG. 8 which shows transistor switching timings, PD voltage, and output voltage. The reset transistor TR in FIG. 7 is first turned on to increase the PD voltage of the photodiode PD up to a reset voltage. Then, the reset transistor TR is turned off. If no light is incident on the photodiode, the PD voltage will be maintained a potential of the reset voltage because of no photoelectric conversion. When the select transistor TS is turned on in this state, the PD voltage is amplified by the amplifier transistor TA, and the amplified voltage signal is read out.

Upon receiving light, the photodiode PD absorbs photoelectrically converted electrons in response to the incident light, and the PD voltage set at the reset voltage is gradually lowered. In readout of this voltage, the select transistor TS is turned on in the same manner as above to read out a voltage signal amplified through the amplifier transistor TR. For example, if the AMI is operated at its normal frame frequency (60 Hz), the signal can be read out after ¹⁄₆₀ seconds from the completion of the reset operation in the reset transistor TR.

The respective outputs in one case where the photodiode PD receives light and in another case where the photodiode PD receives no light will be considered. FIG. 9 is an operational timing chart in which respective PD voltages and output voltages in separated time periods of dark without incident light and bright with incident light are added to the timing chart in FIG. 8. The reset transistor TR and the select transistor TS are driven in the same cycle as that in FIG. 8. In the dark time period, ideally the PD voltage should be maintained a potential of the reset voltage. However, in actual devices, the PD voltage will be slightly lowered due to a leak occurring in the interface of a diffusion layer of the photodiode and a resulting small current flowing as a dark current (leak current). An output during this process is read out. In the bright time period, the PD voltage is gradually lowered due to the outflow of accumulated charges in the junction capacitance of the photodiode in response to incident light. An output during this process is also read out. In a subsequent stage of the pixel circuit, the potential difference between the readout outputs can be determined as a photoelectric conversion value.

A CMOS type solid-state image pickup device has been actively developed for reasons that it has lower power consumption than that in CCD solid-state image pickup devices and no need for any dedicated process as in CCDs. A CMOS process is already in the development stage of the submicron order of a gate length, and its integration is accelerated. In such developments, process-related variations become one of critical problems, and it is further required to clear various problems such as noise while achieving high sensitivity. In the AMI circuit serving as an amplified-type image pickup device, the fixed pattern noise (FPN) caused by variation in the threshold voltage is disadvantageous because the amplifier transistor is used as a source follower. A standard CMOS process involves a threshold voltage variation of at least 10 m $V_{p-p}$. In the amplified-type image pickup device, such a threshold voltage variation is directly associated with an output variation. In addition, since the PD voltage is set at the reset voltage by the source follower of the reset transistor RT, it is lowered by a factor of 2×Vth (threshold voltage) when read out as an output, resulting in a narrowed dynamic range.

SUMMARY OF THE INVENTION

The present invention is directed to provide a solid-state image pickup device capable of solving the above disadvantages. More specifically, it is an object of the present invention to provide a solid-state image pickup device capable of preventing any output variation due to a threshold voltage variation, and preventing a dynamic range from being narrowed in conjunction with deterioration in outputs due to a lowered threshold voltage.

The present invention provides improvements in type and connection of a reset transistor, a select transistor, and an amplifier transistor to achieve the above object. Specifically, the present invention provides a solid-state image pickup device comprising a first MOS transistor serving as a reset switch, a second MOS transistor serving as a select switch, a photodiode, and a third MOS transistor having a source connected in series with the photodiode. In this solid-state image pickup device, the first and second MOS transistors are connected in series with one another between a voltage source and an output end, and the photodiode and the third MOS transistor are connected in series with one another between a voltage source and a ground. Further, the connection point between the first and second MOS transistors is connected to the gate of the third MOS transistor.

Other features and advantages of the present invention will be apparent from the accompanying drawings and from the detailed description,

DESCRIPTION OF THE PREFERRED EMBODIMENT

Figure 1:
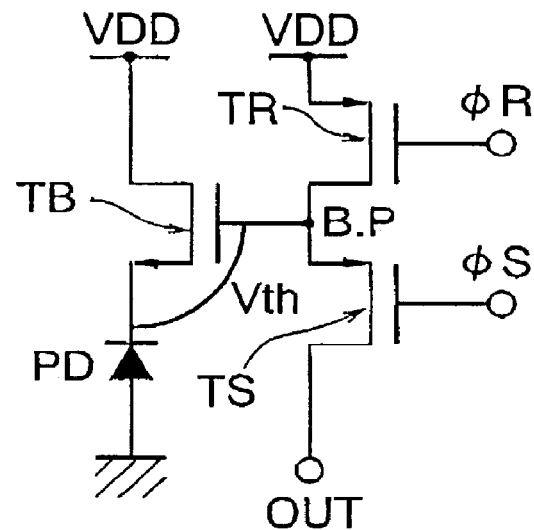
FIG. 1 is a circuit diagram showing a solid-state image pickup device according to one embodiment of the present invention.

FIG. 1 is a circuit diagram showing a solid-state image pickup device according to a first embodiment of the present invention. The solid-state image pickup device comprises three transistors consisting of a P-type MOS transistor TR serving as a reset switch (hereinafter referred to as "reset-switching transistor" occasionally), a MOS transistor TS serving as a select switch (hereinafter referred to as "select-switching transistor" occasionally) and an N-type MOS transistor TB serving as a resetting and bias-setting transistor (hereinafter referred to as "resetting and bias-setting transistor" occasionally), and an embedded photodiode BPD.

The transistor TR and the transistor TS are connected in series with one another between a voltage source VDD and an output end OUT, and the connection point B.P between the transistors TR and TS is connected to the gate of the transistor TB. The transistor TB is connected in series to the cathode of the photodiode PD, and the transistor TB and the photodiode PD are connected in series with each other between a voltage source and a ground. The number of the above elements is the same as that in a conventional solid-state image pickup device, and is acceptable for integration. While the photodiode may be a non-embedded type, and any suitable type such as an avalanche diode may be used, the embedded photodiode can provide a reduced dark current. In this embodiment, the embedded photodiode PD has a cathode connected to the source of the transistor TB, and an anode connected to GND through a substrate.

Figure 2:
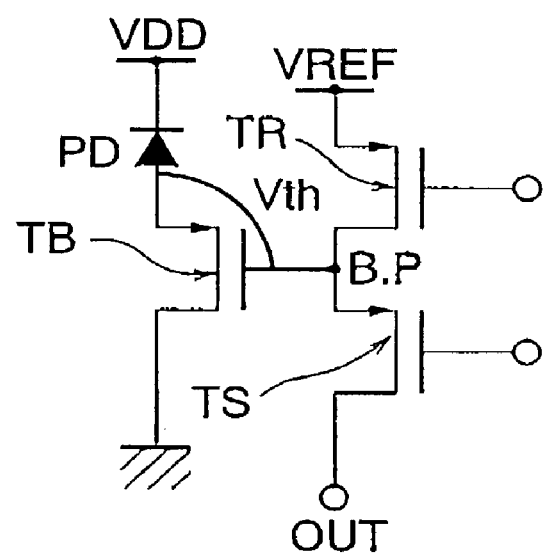
FIG. 2 is a circuit diagram showing a solid-state image pickup device according to another embodiment of the present invention.

FIG. 2 is a circuit diagram showing a solid-state image pickup device according to a second embodiment of the present invention. In the configuration of this pixel circuit, a resetting and bias-setting transistor TB is composed of a P-type MOS transistor, because while an N-type MOS transistor may be used as the resetting and bias-setting transistor, it leads to a narrowed dynamic range. When a P-type MOS transistor is used as the transistor TB, the pixel circuit includes a photodiode PD having a cathode connected to VDD and an anode connected to the source of the P-type MOS transistor TB. The anode of the photodiode PD may be connected to GND, and connected with the P-type MOS transistor TB as with the circuit configuration in FIG. 1. In this embodiment, a reset switching transistor TR is connected to VREF instead of VDD. The value of VREF is determined by a threshold voltage in each process, and can be expressed by the following formula.

$$VREF=VDD-Vth \text{ (PMOS)} \tag{3}$$

While this circuit configuration includes two voltage systems VDD and VREF, the transistors are uniformed in a P-type MOS transistor, which facilitates integration.

Figure 7:
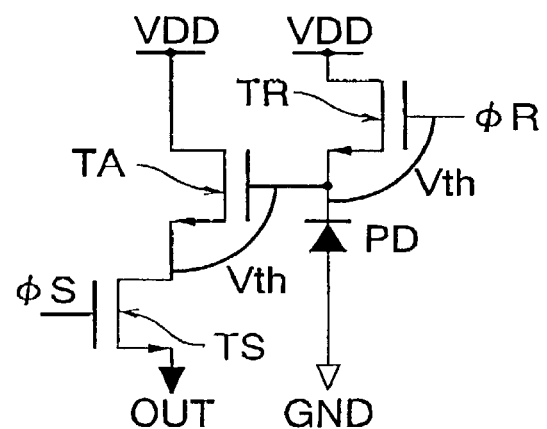
FIG. 7 is a circuit diagram showing a conventional device.
Figure 8:
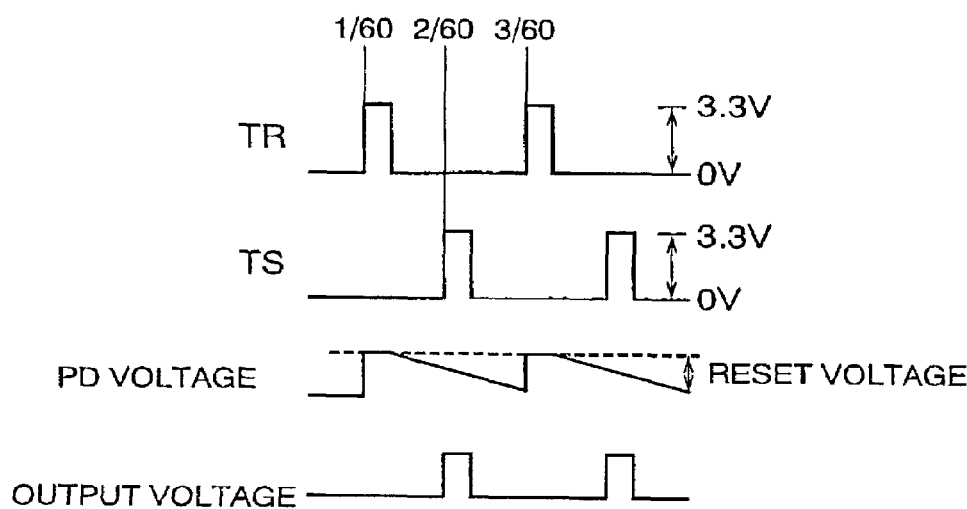
FIG. 8 is an explanatory timing chart of the operation of the conventional device.
Figure 9:
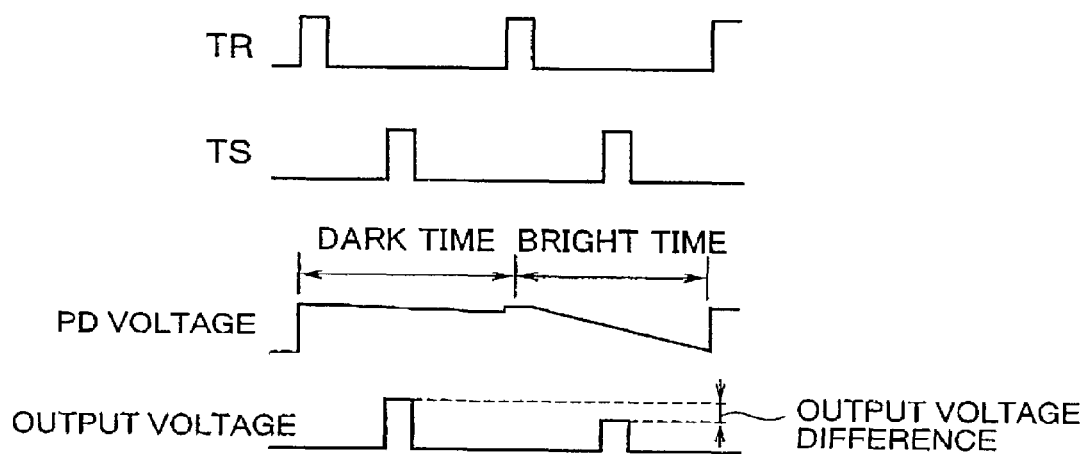
FIG. 9 is an explanatory timing chart of the operation of the conventional device.

The operation of the circuit in FIG. 1 will be described below. Differently from the AMI, the reset switching transistor TR is composed of a PMOS transistor. Thus, given that the transistor TR is turned on at 0 (zero) V (=LOW). In addition, the switching characteristic of the PMOS transistor will be maintained at 3.3 V (=HIGH) without deterioration, whereas the VDD (=3.3 V) signal of a NMOS transistor will be deteriorated, and an output signal lowered by a factor of a threshold voltage will be provided. Referring to FIG 7, the photodiode has the following reset voltage.

$VDD-Vth$=3.3 V−0.7=2.6 V (wherein the threshold voltage is 0.7 V)

This voltage is output through the source follower of the amplifier transistor at the following value.

2.6−0.7=1.9 (V)

Figure 4:
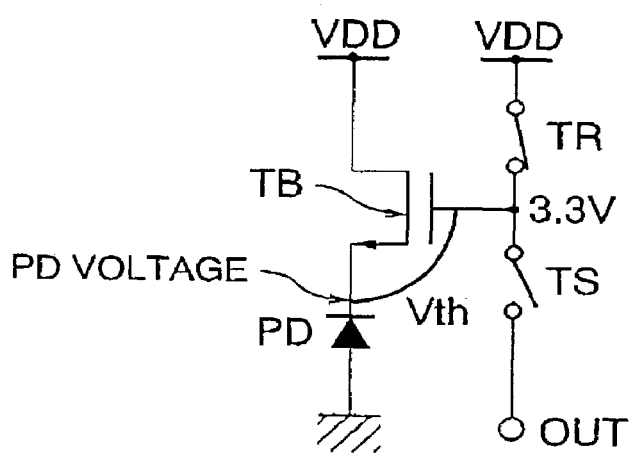
FIG. 4 is an explanatory circuit diagram of the operation of a solid-state image pickup device of the present invention.
Figure 5:
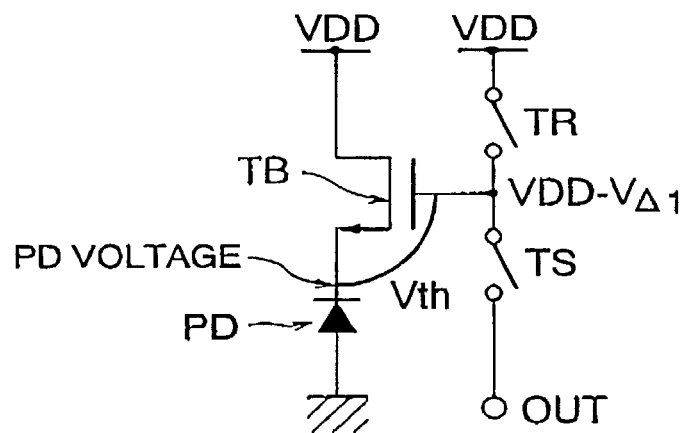
FIG. 5 is an explanatory circuit diagram of the operation of a solid-state image pickup device of the present invention.
Figure 6:
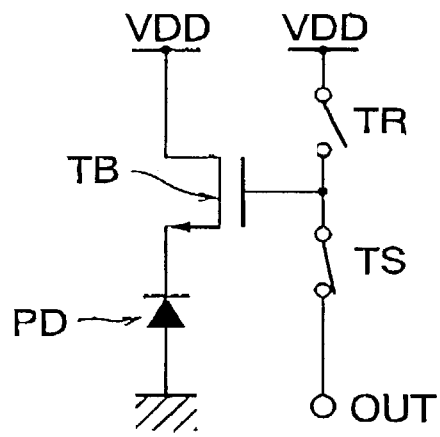
FIG. 6 is an explanatory circuit diagram of the operation of a solid-state image pickup device of the present invention.

With reference to FIGS. 4 to 6, the operation of the circuit of a solid-state image pickup device of the present invention will be described below. For explaining in ways easy to understand, the resetting operation will be described with reference to FIG. 1 as a substitute for FIG. 1. In the circuit of the present invention, when the reset switching transistor TR is turn on (shorted), 3.3 V is applied to the transistors connection point (bias point) B.P (wherein HIGH will not be deteriorated because the reset switching transistor TR is composed of a PMOS transistor). Simultaneously, 3.3 V is applied to the gate of the transistor TB, a reset voltage of 3.3 V (=VDD)−Vth is accumulated at the photodiode PD. The select switching transistor TS is in its OFF (OPEN) state. When the reset switching transistor TS is turned off after charges are accumulated in the photodiode PD to set the reset voltage, the PD voltage of the photodiode PD will be gradually lowered due to a dark current while ideally the voltage is maintained.

FIG. 5 shows the state after the transistor TR is turned off. The voltage at the connection point B.P in this state can be determined by the following formulas.

$Vres=VDD-Vth$ ('.' Vres: reset voltage)

VS1=Vres−VD1 ('.' VS1: PD voltage when incident light is S1, VD1: decrement in PD potential due to photoelectric conversion when incident light is S1)

$VOUT1=VS1+Vth$ (VOUT1: B.P voltage when incident light is S1)

The following formula can be derived from the above three formulas.

$$VOUT1=VDD-Vth-VD1+Vth=VDD-VD1 \quad (4)$$

Further, given that the incident light is changed from S1 to S2, a resulting decrement in the PD voltage being VD2 and a resulting output being VOUT2, VOUT2 can be derived from the above formula as follows.

$$VOUT2=VDD-VD2 \quad (5)$$

Thus, the B.P voltages in the incident lights S1, S2 can be determined by the formulas (4) and (5), respectively.

After the respective B.P voltages are determined, the select switching transistor TS is turned on to perform a readout operation. The state in the readout operation is shown in FIG. 6. During the time period in FIG. 5, the B.P voltage which is a gate voltage of the resetting and bias-setting transistor TB is maintained because there is a parasitic capacitance generated in Vgs (between gate and source). Thus, this circuit configuration allows the B.P voltage to be read out at any timing so as to provide wide compatibility to low-speed to high-speed circuits.

After the VOUT1 and VOUT2 are read out, the difference between them can be determined at a subsequent stage of the pixel circuit. In this way, only the difference including a reduced noise component can be picked up. The difference is derived from the formulas (4) and (5) as follows.

$$VOUT1-VOUT2=VDD-VD1-(VDD-VD2)=VD2-VD1 \quad (6)$$

The operation of the circuit in FIG. 2 is fundamentally the same as the above operation.

A conventional detect sensor such as image sensors incorporates a noise cancelling circuit or a CDS circuit (correlated double sampling circuit) for eliminating threshold voltage variation or noise in many cases. In contrast, the circuit of the present invention can pick up an output voltage independent on a threshold voltage, and thereby the output can be subjected to a simple subtractive operation through an operational amplifier. If a CDS circuit is additionally incorporated therein, a desirable signal can be picked up with more reduced noise component than conventional solid-state image pickup devices to achieve a high S/N ratio, highly sensitive detect sensor.

Figure 3:
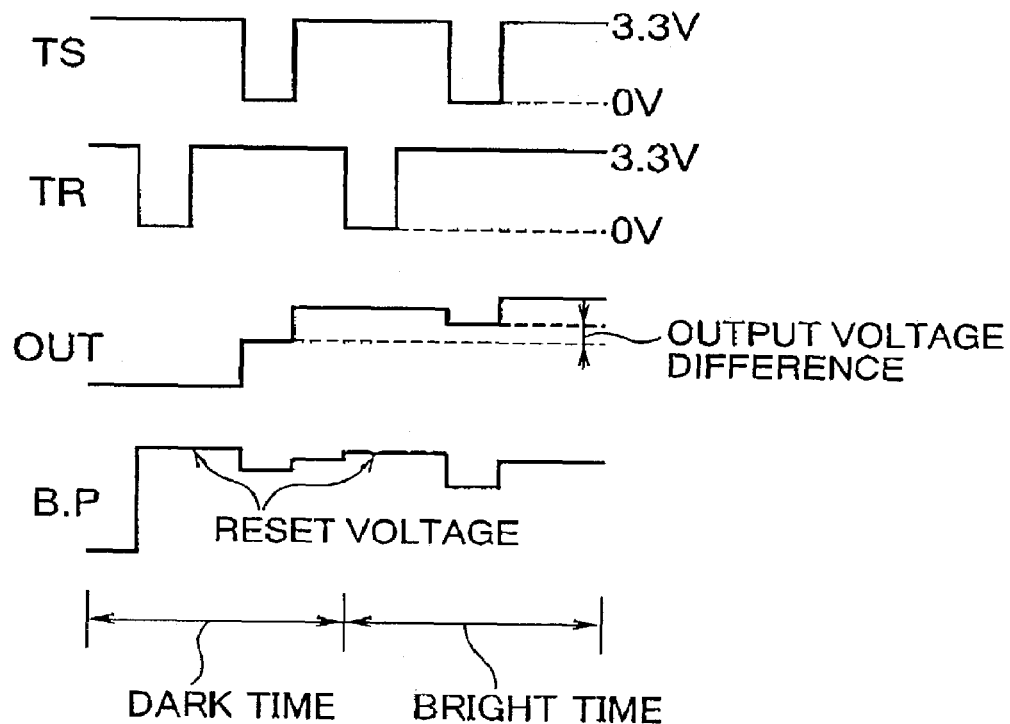
FIG. 3 is an explanatory timing chart of the operation of a solid-state image pickup device of the present invention.

An output voltage range (dynamic range) is determined as follows. A waveform chart is also shown in FIG. 3 just for reference. An output voltage range of the circuit in FIG. 1 will be first described. When receiving no light, the PD voltage has the highest value or the reset voltage. Thus, the reset voltage and B.P voltage become VDD−Vth and VDD, respectively. When the PD voltage becomes 0 V due to incident light, the B.P voltage becomes Vth of the NMOS transistor TB. Therefore, the output range (dynamic range) is in the range of VDD to Vth. Given that VDD=3.3 V and Vth=0.7 V, the dynamic range is 2.6 V.

An output voltage range of the circuit in FIG. 2 will be described below. Given that the threshold voltage Vth of the PMOS transistor in the circuit is 0.8 V. The PD voltage is checked at the anode of the photodiode PD because the cathode of the photodiode is connected to VDD. When receiving no light, the PD voltage has the highest value or VDD. Thus, the B.P voltage becomes VDD—Vth because it is lowered by a factor of Vth. When the photodiode allows current to flow therethrough in response to incident light, the voltage at the photodiode is lowered. For example, when the PD voltage is lowered to Vth, the B.P voltage has a voltage lower than the PD voltage by Vth, or becomes 0 V. Therefore, the output range is in the range of VDD−Vth to 0 V. Since Vth of the PMOS transistor in the circuit is assumed at 0.8 V as above, the dynamic range is 2.5 V.

The solid-state image pickup device of the present invention is not limited to the above embodiments. The present invention may be applied not only to CMOS process-based devices but also any other device using a circuit outputting voltage. While the light-receiving section is preferably composed of an embedded diode having low dark current, the present invention is not limited thereto, but any other types of elements capable of photoelectric conversion may be used. While the present invention can remove the fixed pattern noise through the pixel circuit to eliminate the need for providing any noise cancelling circuit in a subsequent stage, a desirable signal with a higher degree of accuracy than conventional devices may be picked up by combining a noise cancelling circuit.

As mentioned above, according to the present invention, the switching transistor using a P-type MOS transistor can provide an extended output or dynamic range without increasing the number of elements and providing any additional control terminal. In addition, the solid-state image pickup device of the present invention can prevent output deterioration due to variation in a threshold voltage, and can be produced through a conventional process. While conventional CMOS solid-state image pickup devices have a threshold voltage variation of at least 10 to 30 mV, it has been verified that the solid-state image pickup device of the present invention can achieve a significantly reduced threshold voltage variation of about 1 to 3 mV even if the threshold voltage is changed from 0.6 V to 0.8 V. This means that the output is not affected by variation or change in the threshold voltage.

What is claimed is:

1. A solid-state image pickup device, comprising:
   a first MOS transistor serving as a reset switch;
   a second MOS transistor serving as a select switch to provide an output of the device;
   a photodiode;
   a third MOS transistor having a source connected in series with said photodiode;
   wherein said first and second MOS transistors are connected in series with one another between a voltage source and an output end;
   wherein said photodiode and said third MOS transistor are connected in series with one another between a voltage source and ground;
   wherein a voltage signal related to an incident light is present at a gate of said third MOS transistor when said first MOS transistor is OFF, the voltage signal including a voltage across said photodiode and a voltage between the gate and the source of said third MOS transistor; and
   wherein said gate is coupled to a connection point between said first and second MOS transistors.

2. A solid-state image pickup device, comprising:
   a first P-type MOS transistor serving as a reset switch transistor, said first P-type MOS transistor being connected to a voltage source;
   a second P-type MOS transistor serving as a select switch transistor, said second P-type MOS transistor being connected in series with said first P-type MOS transistor, a drain of said second P-type MOS transistor providing an output of the device;
   a third N-type MOS transistor serving as a resetting and bias-setting transistor, said third N-type MOS transistor having a drain connected to a voltage source;
   a photodiode connected in series to the source of said third N-type MOS transistor, said photodiode having an anode connected to ground;
   wherein a voltage signal related to an incident light is present at a gate of said third N-type MOS transistor when said first P-type MOS transistor is OFF, the voltage signal including a voltage across said photodiode and a voltage between the gate and the source of said third N-type MOS transistor; and
   wherein said gate is coupled to a connection point between said first and second P-type MOS transistors.

3. A solid-state image pickup devices, comprising:
   a first P-type MOS transistor serving as a reset switch transistor, said first P-type MOS transistor being connected to a reference voltage source;
   a second P-type MOS transistor serving as a select switch transistor, said second P-type MOS transistor being connected in series with said first P-type MOS transistor, a drain of said second P-type MOS transistor providing an output of the device;
   a photodiode having a cathode connected to a voltage source; and
   a third P-type MOS transistor serving as a resetting and bias-setting transistor, said third P-type MOS transistor being connected to an anode of said photodiode, said third P-type MOS transistor having a drain connected to ground;
   wherein a voltage signal related to an incident light is present at a gate of said third P-type MOS transistor when said first P-type MOS transistor is OFF, the voltage signal including a voltage across said photodiode and a voltage between the gate and a source of said third P-type MOS transistor; and
   wherein said gate is coupled to a connection point between said first and second P-type MOS transistors.

* * * * *